May 21, 1957 J. H. GRÜNEWALD 2,793,139
METHOD FOR PRODUCING BITUMINOUS MIXTURES FOR
ROAD BUILDING PURPOSES
Filed Aug. 25, 1955
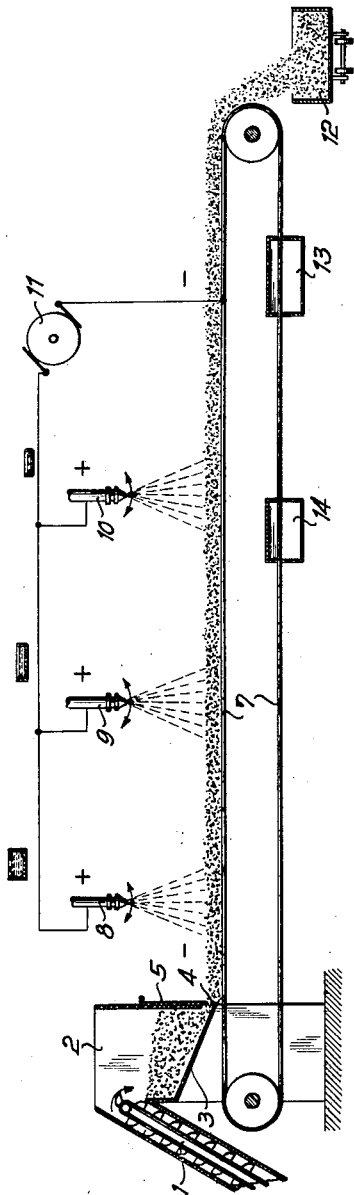
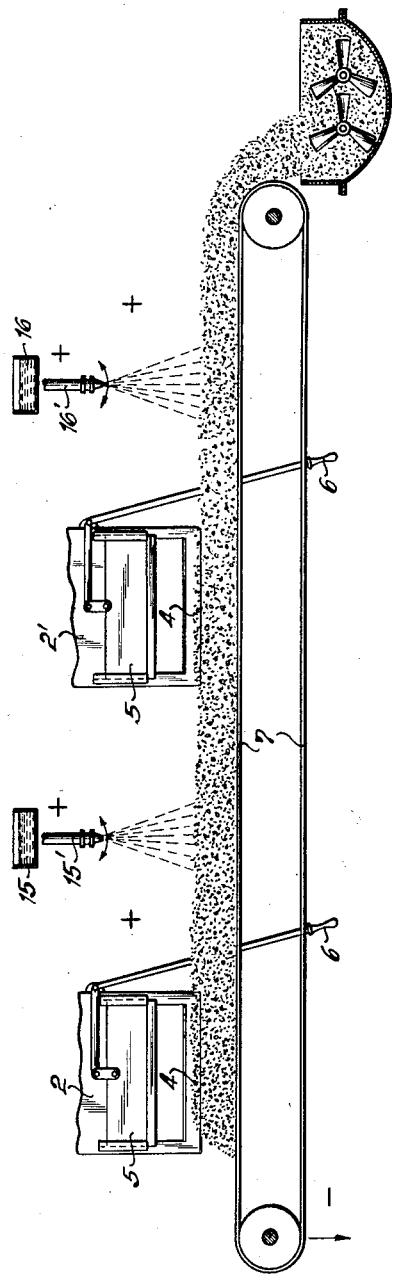
INVENTOR
JOHANNES Hans GRÜNEWALD
by: Michael S. Striker United States Patent Office 2,793,139
Patented May 21, 1957

2,793,139

METHOD FOR PRODUCING BITUMINOUS MIXTURES FOR ROAD BUILDING PURPOSES

Johannes Hans Grünewald, Hildesheim, Germany

Application August 25, 1955, Serial No. 530,599

Claims priority, application Germany August 26, 1954

2 Claims. (Cl. 117—93)

The condition and quality of stone material which is to be used in the production of road building materials differs depending on its source and origin. For road building purposes stone materials of different, varied particle sizes are used together. These stone materials are dried in suitable drying apparatus and subsequently separated by sieving according to the different particle sizes. It is also possible to pre-sort the different particle sizes in storage bins prior to the drying operation and then to introduce a stone mixture of uniform grain size into the drier. After weighing of the stone material and introduction of the same into a mixer, bitumination of this road building material takes place.

Many different methods and variations have been used for the bitumination of road building materials.

According to one of the oldest methods, a predetermined weighed quantity of binding material was poured into a double shaft forced mixer and mixed therein by a kneading operation. In other words the stone materials were covered with bitumen in this operation.

In order to avoid this kneading operation it has been proposed to whirl the stone material about and to direct a mist-like stream of sprayed bitumen into the whirling zone. The whirling of the solid building materials was accomplished in various manners. In one case a roller provided with ledges or other extensions was arranged underneath the outlet opening of a storage bin containing the granulated stone material, and this roller when turning during the release of granulated stone material from the storage bin caused a whirling motion of the stone grains in a so-called mixing chamber. A fine spray of bitumen or binder was then introduced through nozzles into the mixing chamber. In the mixing chamber provided with the whirling roller there were also arranged, in the vicinity of the bottom of the chamber two mixing shafts with stirring wings for the purpose of again thoroughly mixing the bituminized material and to conduct it to the outlet of the mixing chamber. From there the bituminous material was dropped directly into a transport vehicle such as a railroad car positioned underneath the outlet of the mixing chamber. Kneading did not take place according to this method. The aforementioned mixing shafts were somewhat similar to the shafts of a double shaft forced mixer.

According to another method too a variation of a double shaft forced mixer is used. Hereby the wings of the mixing shaft serve to whirl about the granular material which is to be bituminized. Similarly to the method described further above, in this case too the bitumen mist is sprayed into the mixing chamber. After the completion of the bitumination of the material, the mixer is emptied and the finished mixed is conveyed itno a transport vehicle.

It is also known to produce a so-called inactive filler by whirling the stone powder so that the solid particles are more or less in suspension, and to spray a bitumen mist into the mixing chamber whereby the bituminous particles are covered with solid particles and thereby an inactive filler material capable of being stored is formed.

In order to produce this inactive filler it has also been proposed to let the stone flour or the stone particles flow onto a conveyer belt. While moving on the conveyer belt the stone material was then sprayed with bitumen. The bitumen particles which thereby were covered with particles of solid material were moved over a screen to an outlet, while particles of the solid material which had not combined with the bitumen passed through the screen and were returned to the storage bin for the solid particles by means of a second conveyer belt moving underneath and in opposite direction to the first conveyer belt.

None of these methods of the prior art took into consideration the specific structure and conditions of specific stone materials used. However, for a reliable and effective bitumination it is of decisive importance to take into consideration the specific structure of the used stone material. The very best bitumination will not be successful if there is no possibility for the bitumen to be anchored in the pores of capillaries of the dried stone particles.

Furthermore, according to these methods of the prior art it remains a matter of chance how and to what extent grains of different sizes of the road building material were covered with bitumen.

It is, therefore, one object of the present invention to adapt the composition of the bitumen which is to be used in the production of road building materials is adapted to the specific structure and quality of the solid road building materials. The type and quality of the solid particles and of the bitumen solution are thus adjusted to each other.

According to the method of the present invention it is therefore first of all determined what kind of bitumen solution would best be suited to the specific structure of the stone material which is to be used, thereafter the bitumen solution is subdivided in separate groups which successively come in contact with the stone material by being sprayed thereon in a mist-like dispersion. The first bitumen group will be suitably so composed as to be capable of most easily penetrating into the structure of the stone granules or in the capillaries of the same, the second group of bitumen will be so composed that it can best utilize the bituminous anchor formed by the first group in the stone grains for adhering to the stone particles, and the third group of the bitumen will be so composed that it will be capable of covering the stone particles with bitumen in the desired manner. In this way it is achieved that the bitumen is absolutely firmly anchored in the stone particles and that subsequent penetration of water into the grains is prevented.

It is another object of the present invention to subdivide the solid road building materials which are to be bituminized according to their different granular sizes and to contact each portion of substantially uniform grain size with bitumen solutions especially suitable for the same. It is within the skill of the art to mix the solid particles with the bitumen solution by whirling of the solid particles or in other known manner.

It is yet another object of the present invention proposed to employ an apparatus which accomplishes the gradual bitumination of the granular road building materials by electro-mechanical means.

With these and other objects in view which will become apparent in the following detailed description, the present invention will be clearly understood in connection with the accompanying drawings, in which:

Figure 1 is an elevated schematic view of a preferred embodiment of an apparatus for the electrostatic covering of granular road building materials with bitumen; and Figure 2 is an elevated schematic view of another preferred embodiment of an apparatus for the electrostatic covering of granular road building materials with bitumen.

Referring now to the drawing and particularly to Fig. 1, a bucket elevator 1 is shown for introducing dried granular or pulverized stone road building material into container 2. The bottom of container 2 is formed by chute 3. Outlet opening 4 of container 2 may be closed or opened by slide 5 which may be actuated by hand or automatically. According to the embodiment illustrated in Fig. 2, slide 5 may be closed or opened by means of hand lever 6. Reference numeral 7 indicates a vibrating conveyer belt which may be caused to vibrate by means of electro-magnetic devices well known in the art. As shown in Fig. 1, the solid road building materials reach conveyer belt 7 through opening 4 of container 2. Since conveyer belt 7, in addition to this forward movement, also performs a vibrating oscillating movement, the particles of stone material are whirled about while moving on conveyer belt 7. Nozzles 8, 9 and 10 are arranged at a suitable height above conveyer belt 7. According to the illustrated embodiment these nozzles are formed as spray electrodes. The nozzles are conductively connected with the positive terminal of direct current generator 11. In the illustrated embodiment, the collecting electrode is formed by the conveyer belt 7.

Spray electrode 8 communicates with container 8', spray electrode 9 with container 9' and spray electrode 10 with container 10'. Containers 8', 9' and 10' contain the different groups of bitumen solutions. As shown in Figure 1, the solid road building materials are successively electrostatically treated and covered with bitumen supplied from the different groups of bitumen solutions, and then discharged from conveyer belt 7 into a transport vehicle 12. Bituminous materials which adhere to conveyer belt 7 may be washed off without difficulty in washing vessels 13 and 14 and may eventually be used again.

Referring now to Fig. 2, a similar conveyer belt installation is shown which is fed from containers 2 and 2'. While in this case for instance coarse grain solid material reaches the conveyer belt from container 2, fine grain solid material is supplied from container 2'. Corresponding to the coarseness and quality of stone grains in container 2 a suitable bitumen solution is chosen to be dispensed from container 15 and similarly a suitable bitumen solution corresponding to the finer grain reaching the conveyer belt from container 2, is dispensed from container 16. Spray electrodes 15' and 16' are used for spraying these solutions onto the particles whirling about on conveyer belt 7, which also forms the collecting electrode, and in this way the electrostatic covering of the solid road building materials with bitumen is accomplished. The spray electrodes 8, 9, 10, 15' and 16' of Figures 1 and 2 may also be tiltable in the longitudinal direction of conveyer belt 7, as indicated by the arrows underneath the spray electrodes. Accordingly the direction of the spray jet of bitumen solution may be angularly adjusted relative to the moving stone particles.

It follows from the foregoing that the dried solid road building materials, irrespective of grain size, are capable of eagerly absorbing the first group of bituminous solution and that thereby penetration of moisture into the grains is permanently and completely prevented. It follows further that the penetration of this first group of bitumen solution into the stone material forms an anchorage for the second group of bituminous solution and this second group of bituminous solution again forms a basis for the formation of a thin film-like covering of bitumen on the entire surface of the stone grain. By the electrostatic covering of the stone grains with bitumen, the bitumination of each individual stone grain is electrically controlled and not, as in the methods of the prior art, a matter of chance.

It is also within the scope of the present invention to use for the treatment of solid stone particles instead of the first group of bitumen solution for instance a highly fluid solution of synthetic resins or of any other solution which is capable of penetrating into the pores and capillaries of the stone particles and of assuring firm adherence of the bitumen thereto. According to the method of the present invention it is therefore possible to use various synthetic materials which previously could not be used for road building purposes. Rubber solutions too may be used for this purpose, according to the present invention.

While I have disclosed several embodiments of the present invention, it is to be understood that these embodiments are given by example only and not in a limiting sense, the scope of the present invention being determined by the objects and the claims.

I claim:

1. A method of producing bituminous mixtures for road building purposes by means of bituminous solutions as binding materials comprising the steps of moving solid road building materials along a plurality of spraying stations, and spraying successively bituminous solutions of diminishing degrees of dilution on said solid road building materials in the respective stations, so that the spraying of the bituminous solution of greatest dilution in the first of said stations forms the anchoring of the bitumination on said solid road building material, whereby the latter is rendered impervious to moisture, while each subsequent spray of said bituminous solution of lesser degree of dilution forms a firm bituminous bond with the layer applied in the previous spraying station.

2. The method, as set forth in claim 1, in which each of said spraying steps is performed in an electrostatic field.

References Cited in the file of this patent

UNITED STATES PATENTS

| | | |
|---|---|---|
| Re. 20,119 | Sommer | Sept. 22, 1936 |
| 1,954,997 | Hirzel | Apr. 17, 1934 |
| 1,975,458 | Hirzel | Oct. 2, 1934 |
| 1,975,902 | McConnaughay | Oct. 9, 1934 |
| 2,186,750 | Carter | Jan. 9, 1940 |
| 2,200,155 | Camp | May 7, 1940 |
| 2,270,341 | Ransburg | Jan. 20, 1942 |
| 2,592,342 | Dosmann | May 6, 1952 |

FOREIGN PATENTS

| | | |
|---|---|---|
| 574,366 | Great Britain | Jan. 2, 1946 |